United States Patent
Lau

(10) Patent No.: US 6,704,968 B2
(45) Date of Patent: Mar. 16, 2004

(54) AUXILIARY HANDLE ATTACHABLE TO TOOLS FOR MOVING BULK MATERIAL

(76) Inventor: W. Karl Lau, 59 Park Dr., Glenview, IL (US) 60025

(*) Notice: Subject to any disclaimer, the term of this patent is extended or adjusted under 35 U.S.C. 154(b) by 0 days.

(21) Appl. No.: 10/244,770

(22) Filed: Sep. 16, 2002

(65) Prior Publication Data

US 2003/0051315 A1 Mar. 20, 2003

Related U.S. Application Data

(60) Provisional application No. 60/322,609, filed on Sep. 17, 2001.

(51) Int. Cl.[7] ............................. B25G 3/00; A45C 13/22
(52) U.S. Cl. ........................ 16/426; 16/DIG. 41; 294/58
(58) Field of Search .................. 16/426, 422, DIG. 40, 16/DIG. 41; 294/19.1, 25, 51, 54.5, 57, 58, 59

(56) References Cited

U.S. PATENT DOCUMENTS

| | | | | |
|---|---|---|---|---|
| 237,891 A | * | 2/1881 | Musselman | 16/426 |
| 3,466,078 A | * | 9/1969 | Sholund | 294/57 |
| 4,155,582 A | * | 5/1979 | Reisner | 294/58 |
| 4,911,575 A | * | 3/1990 | Tidwell | 404/97 |
| 5,474,350 A | * | 12/1995 | Gauthier | 294/58 |
| 5,499,852 A | * | 3/1996 | Seigendall | 294/58 |
| 5,546,749 A | * | 8/1996 | Couchee | 60/370 |
| 5,625,922 A | * | 5/1997 | Morad | 16/426 |
| 5,661,960 A | * | 9/1997 | Smith et al. | 56/12.7 |
| 5,669,101 A | * | 9/1997 | Aiyama et al. | 16/436 |
| 5,921,600 A | | 7/1999 | Lucas | 294/58 |
| 6,062,619 A | | 5/2000 | Clark, Jr. | 294/58 |
| D436,506 S | | 1/2001 | Crowe, Jr. | D8/10 |
| 6,199,245 B1 | | 3/2001 | Blessing | 16/430 |
| 6,203,081 B1 | | 3/2001 | Kegan, Sr. | 294/59 |
| D441,623 S | | 5/2001 | Storlie | D8/10 |
| 2003/0057721 A1 | * | 3/2003 | Ducklow | 294/58 |

FOREIGN PATENT DOCUMENTS

| | | | |
|---|---|---|---|
| DE | 10034949 A1 | * | 7/2002 |
| JP | 1-135484 | * | 5/1989 |
| JP | 2002-199801 | * | 7/2002 |

* cited by examiner

*Primary Examiner*—Chuck Y. Mah
(74) *Attorney, Agent, or Firm*—Synnestvedt & Lechner LLP

(57) ABSTRACT

An auxiliary handle attachable to a tool having an elongated handle is disclosed. The auxiliary handle has a shaft with a gripping yoke at one end for manual gripping. At the opposite end of the shaft a contact surface is positioned which interfaces with the tool handle in abutting relationship. A clamp is positioned facing the contact surface for clamping the contact surface against the tool handle. The contact surface is angularly disposed so as to permit the auxiliary handle to be angularly oriented with respect to the tool handle. The contact surface is divided into two contact faces which engage the tool handle in spaced relation to each other. The clamp has a clamping piece with a contact region also divided into spaced apart contact surfaces for engaging the tool handle. The clamping piece is bolted to the shaft. A cross bolt and clips hold the attachment bolts to the sides of the shaft.

13 Claims, 4 Drawing Sheets

AUXILIARY HANDLE ATTACHABLE TO TOOLS FOR MOVING BULK MATERIAL

RELATED APPLICATION

This application is based on and claims the benefit of U.S. Provisional Application No. 60/322,609, filed Sep. 17, 2001.

FIELD OF THE INVENTION

The invention concerns an auxiliary handle attachable to an elongated tool handle for tools such as shovels, rakes, pitchforks, hoes and the like.

BACKGROUND OF THE INVENTION

Tools having elongated handles such as shovels, rakes, pitchforks and the like are the cause of many injuries and even fatalities each year. As shown in FIG. 1, the use of a shovel 10 having an elongated handle 12 according to the prior art requires the user to bend at the waist to effectively use the tool to move or lift bulk material such as dirt, snow, cement and the like. This position is uncomfortable and places a significant burden on the muscles of the back and neck. Rapid fatigue of the user is often the result, thus, limiting the efficiency and length of time one can use such tools. The handle may also lead to neck and back strain (lumbosacral sprain), herniated discs between vertebrae, lower abdominal hernias, as well as other problems normally associated with lifting a heavy load with the back muscles. Furthermore, the increased effort needed to work with tools having handles according to the prior art can lead to a heart attack as is evidenced by the jump in the number of heart attacks which occurs annually during the winter months in regions which receive significant snow fall which must be shoveled.

There is clearly a need for ergonomically improved handles for tools used to move bulk material which relieves the strain on the user's back, is less fatiguing and more comfortable to use.

SUMMARY AND OBJECTS OF THE INVENTION

The invention concerns an auxiliary handle attachable to an elongated tool handle of a tool to facilitate manual lifting of a working end of the tool. The auxiliary handle comprises an elongated shaft having a contact surface at one end adapted to engage the tool handle. A clamp comprising a clamping piece is attached to the shaft at the one end for clamping the contact surface against the tool handle. A gripping yoke is mounted on an opposite end of the shaft for manual gripping of the auxiliary handle to facilitate lifting of the tool and its load.

Preferably, the clamping piece comprises a contact region adapted to engage the tool handle. The contact region is positioned opposite to and facing the contact surface on the end of the shaft. A pair of flanges extend outwardly from opposite sides of the contact region transversely to the tool handle. A pair of elongated fasteners are mounted along opposite sides of the shaft at the one end, each fastener comprises a first end engageable with the shaft, and a second end engageable with one of the flanges. The fasteners clamp the contact region and the contact surface against the tool handle for retaining the auxiliary handle to it.

Preferably, the contact surface on the end of the shaft comprises a pair of contact faces angularly oriented relatively to one another so as to face a common center or an axis coaxial with the long axis of the shaft. The contact faces contact the tool handle in spaced relation to one another circumferentially around the tool handle. The contact faces may also be angularly oriented relatively to the long axis of the shaft about an axis perpendicular to both the long axis of the shaft and the long axis of the tool handle for orienting the shaft angularly relatively to the tool handle.

The contact region on the clamping piece comprises a pair of second contact faces angularly oriented relatively to one another so as to face a second common center, preferably located on the long axis of the shaft, the second contact faces contacting the tool handle in spaced relation to one another circumferentially around the tool handle.

The clamp allows the auxiliary handle to be adjustably positioned along the length of the elongated tool handle for positioning the gripping yoke at a position allowing manual grasping thereof by a user in a substantially upright posture, thereby reducing or eliminating the potential for back strain.

The invention also contemplates a tool having an auxiliary handle as described above.

It is an object of the invention to provide an auxiliary handle attachable to the elongated handle of a tool.

It is another object of the invention to provide an auxiliary handle which is variably positionable along the length of an elongated handle of a tool.

It is again another object of the invention to provide an auxiliary handle which is angularly oriented with respect to the elongated handle of a tool.

It is yet another object of the invention to provide an auxiliary handle attachable to an elongated handle of a tool which allows the tool to be used assuming a substantially upright posture.

These and other objects and advantages of the invention will become apparent upon further consideration of the drawings and detailed description of a preferred embodiments which follows.

DETAILED DESCRIPTION OF A PREFERRED EMBODIMENT OF THE INVENTION

Figure 2:
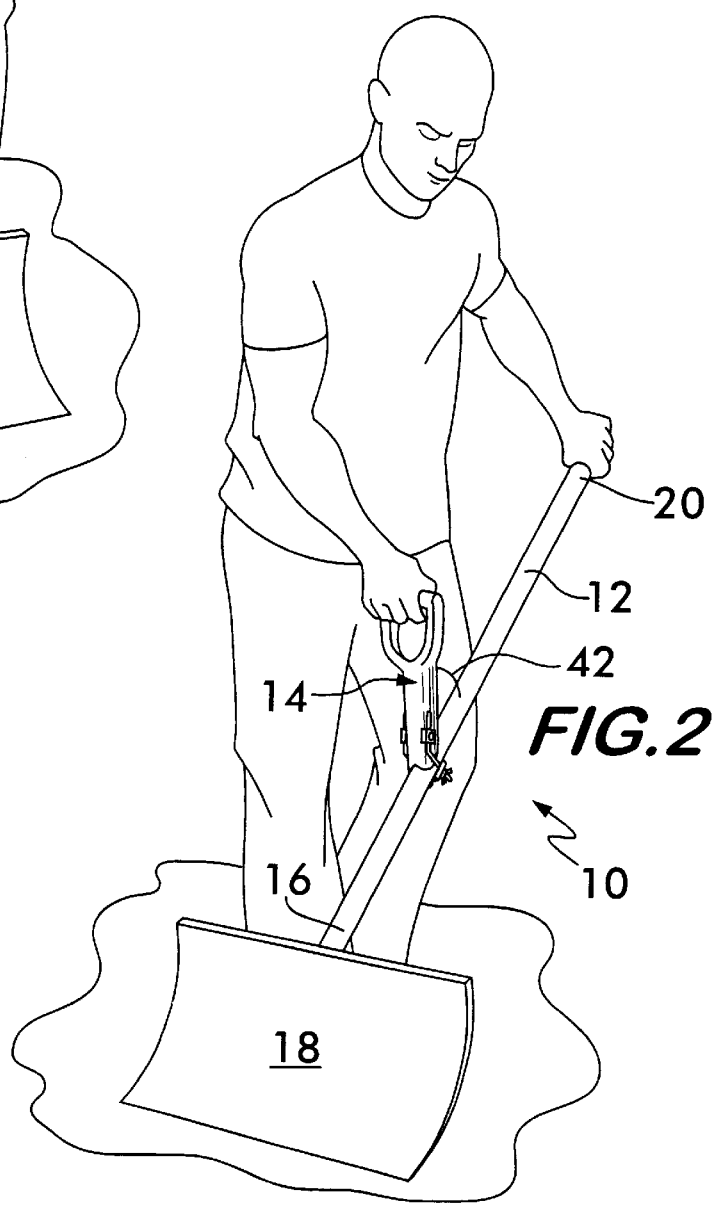
FIG. 2 is a perspective view of a tool having an auxiliary handle according to the invention as used by a person.

FIG. 2 shows a shovel 10 having an elongated handle 12 with an attached auxiliary handle 14 according to the invention. The auxiliary handle 14 will work equally well with other tools such as rakes, pitchforks, hoes, as well as other types of shovels, all of which have a working end 16 attached to a working piece 18 adapted to move bulk material. The shovel 10 is shown herein by way of example only and is not intended to limit the use of the auxiliary handle in any way.

Figure 1:
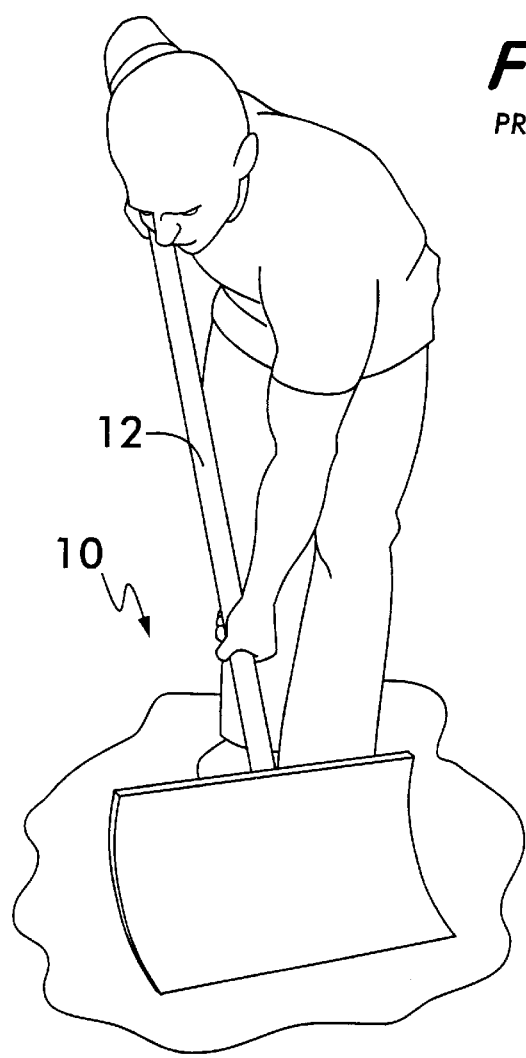
FIG. 1 is an illustration of a person using a tool for moving bulk material, the tool having an elongated handle according to the prior art.

The auxiliary handle 14 is variably positionable along the elongated handle 12 between the working end 16 and the opposite end 20 at a position to afford ergonomic and mechanical advantage to the user as shown by a comparison of FIGS. 1 and 2. The tool 10 to which the auxiliary handle 14 is attached may be used by the person with a substantially upright posture as illustrated in FIG. 2. This posture allows the load on the tool to be kept close to the user's body; lifting is accomplished mainly by means of the arm muscles thereby avoiding fatigue as well as back and neck strain.

Figure 3:
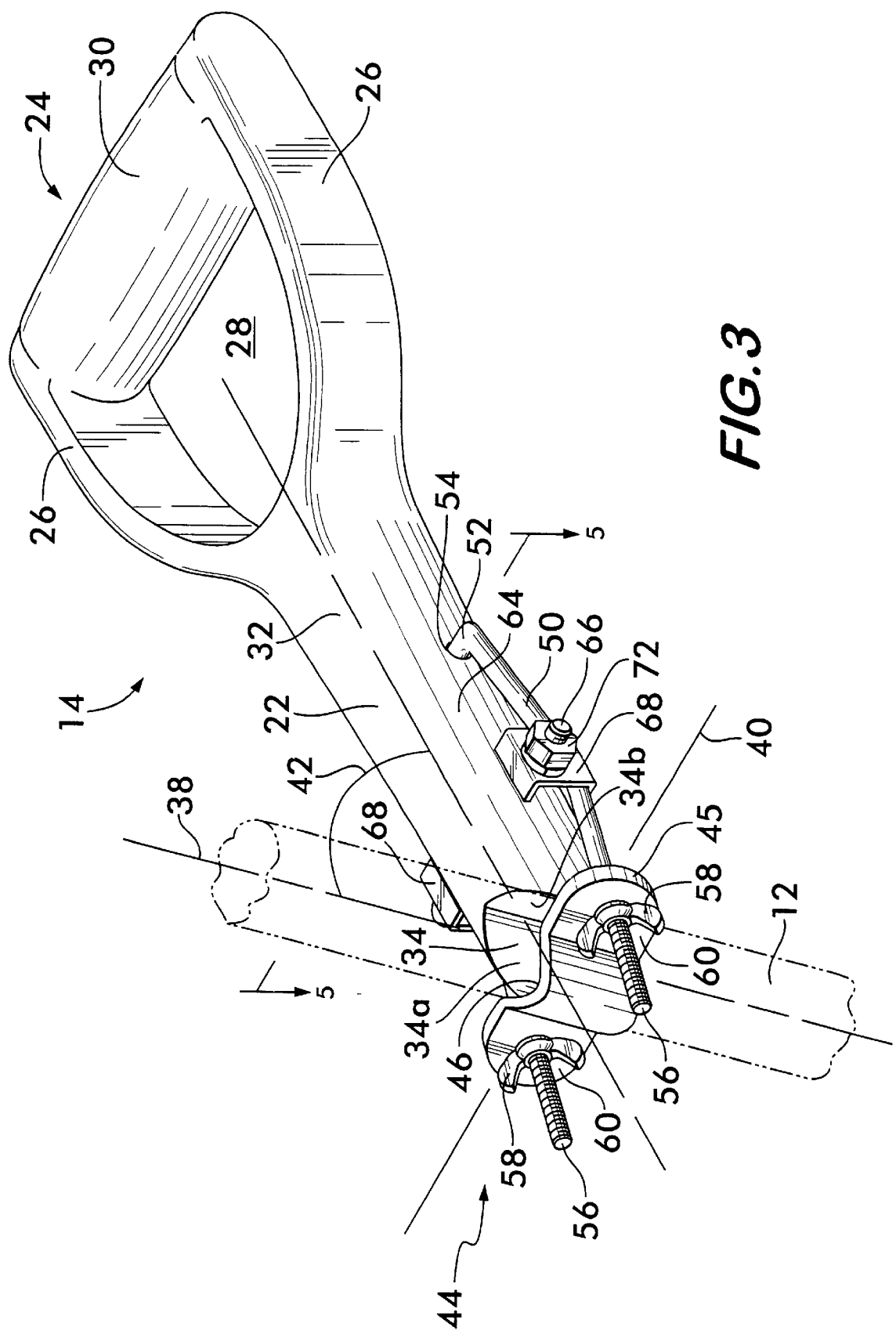
FIG. 3 is a detailed perspective view of the auxiliary handle shown in FIG. 2 on an enlarged scale.
Figure 4:
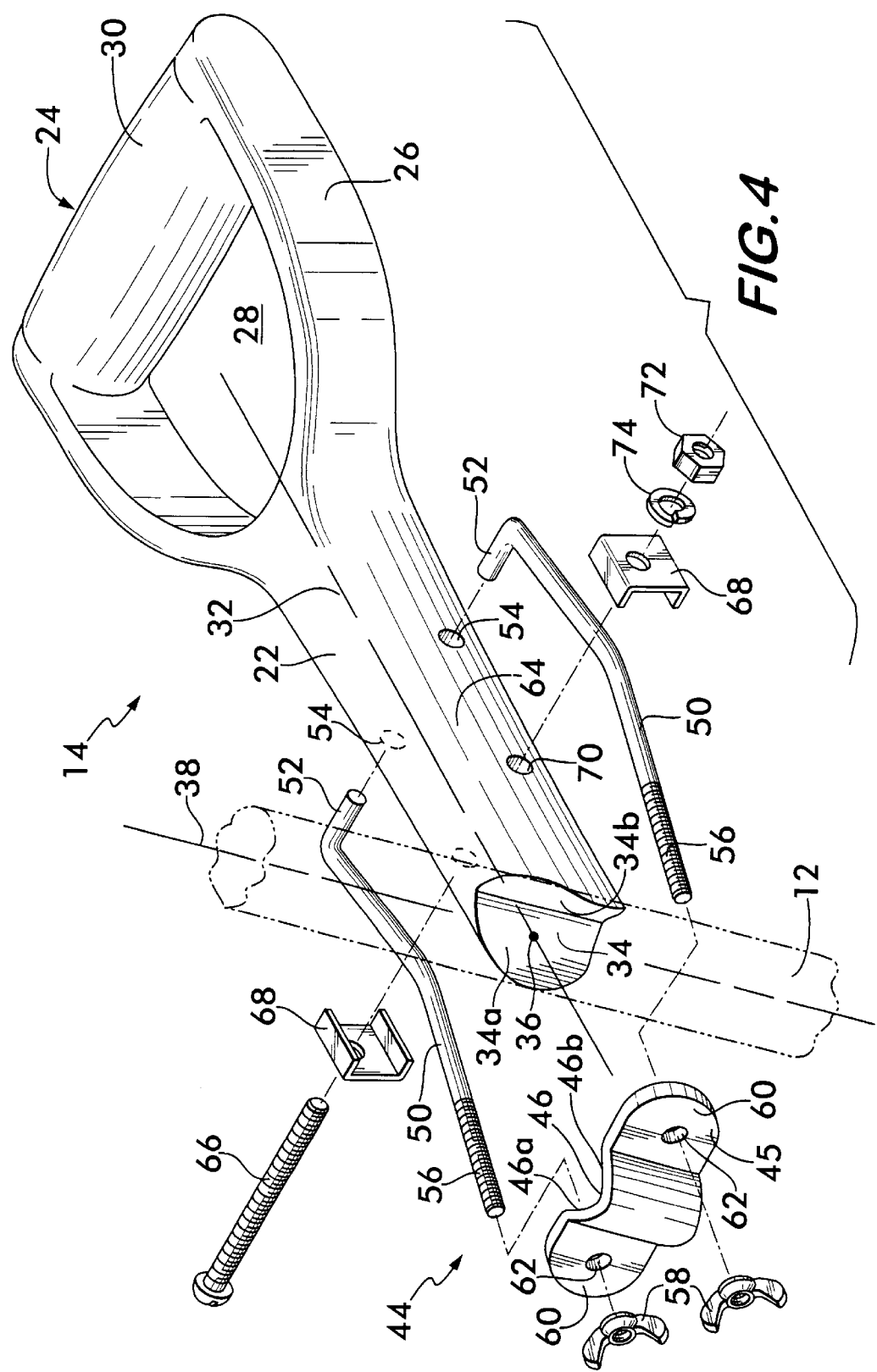
FIG. 4 is an exploded perspective view of the auxiliary handle shown in FIGS. 2 and 3.

FIGS. 3 and 4 show the auxiliary handle 14 in detail. The auxiliary handle comprises a shaft 22 with a gripping yoke 24 attached to one end to allow it to be manually grasped by the user as shown in FIG. 2. The gripping yoke 24 comprises a pair of side portions 26 extending from the shaft 22 and arranged in spaced relation to one another defining an opening 28 between them. A hand grip 30 is attached between the side portions 26 and is preferably oriented substantially perpendicularly to the long axis 32 of shaft 22. This permits the use of an overhand grip which avoids strain and possible injury to the wrist.

The other end of the shaft 22 is adapted to attach to the elongated tool handle 12 in abutting engagement and has a contact surface 34 interfacing with the elongated tool handle. Preferably, contact surface 34 is divided into two contact faces 34a and 34b positioned angularly with respect to one another so as to both face toward a common center 36 (see FIG. 4) preferably on the long axis 32. The contact faces 34a and 34b are arranged on opposite sides of the long axis 32 to provide at least two contact points engaging the elongated tool handle 12 in spaced relation to one another circumferentially around the tool handle. Use of two angled contact faces 34a and 34b allows the auxiliary handle 14 to accommodate a relatively large range of elongated tool handle sizes and shapes and is especially suited to engage the round handles most commonly found on tools for moving bulk material.

As best shown in FIG. 3, contact faces 34a and 34b are further angularly oriented relatively to the long axis 32 of shaft 22 about an axis 40 which is perpendicular to both the long axis 32 of shaft 22 and the long axis 38 of tool handle 12. The angular relation between faces 34a and 34b and the long axis 32 of the shaft 22 allows the shaft 22 of auxiliary handle 14 to be oriented at an angle 42 to the tool handle 12. Angle 42 of shaft 22 provides for further ergonomic adjustment of auxiliary handle 14 allowing efficient lifting with the substantially upright posture shown in FIG. 2.

Figure 5:
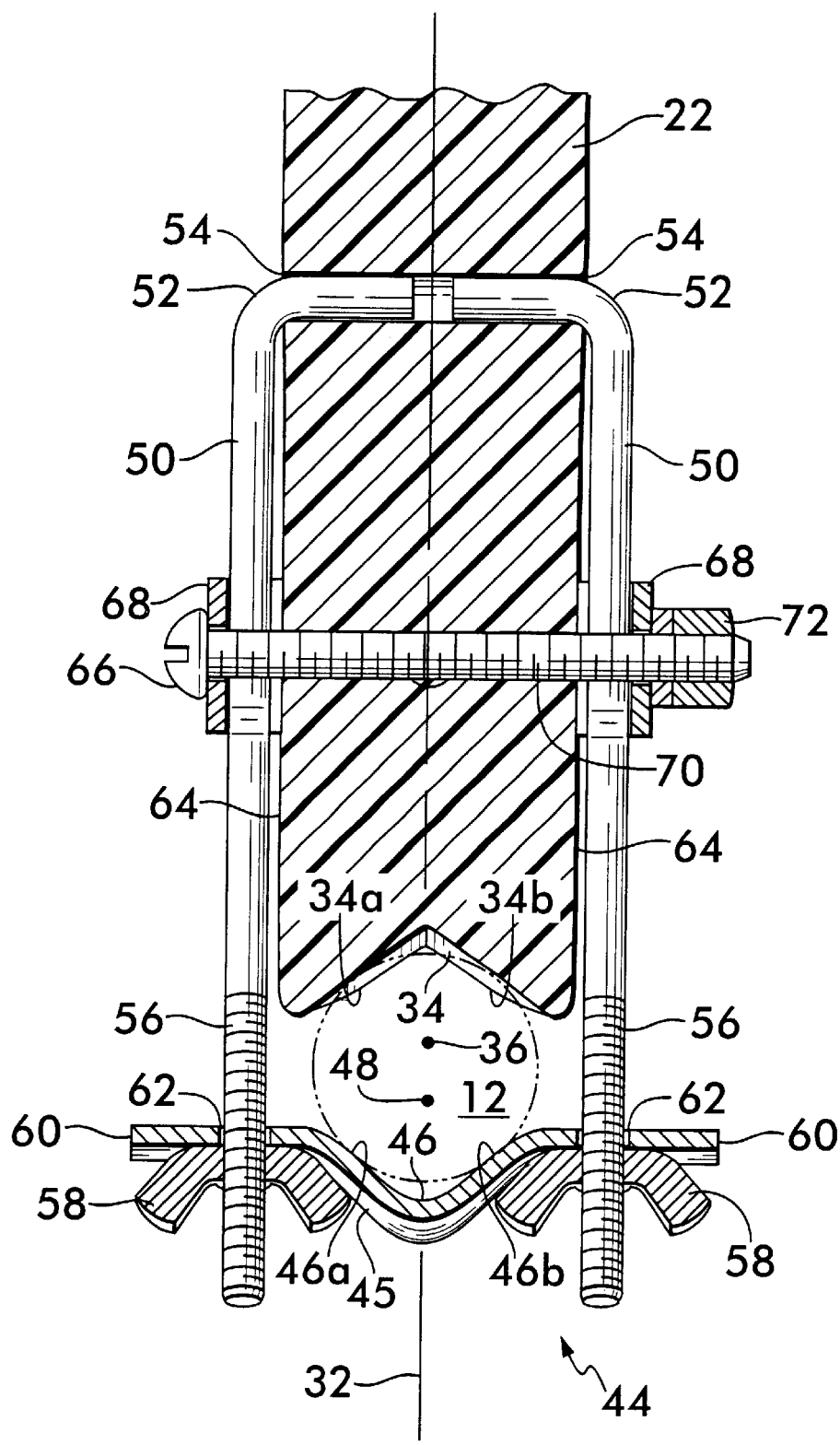
FIG. 5 is a cross-sectional view taken along lines 5—5 of FIG. 3.

A clamp 44 is arranged at the end of the shaft 22 opposite gripping yoke 24. As shown in FIG. 5, clamp 44 preferably comprises a clamping piece 45 having a contact region 46 positioned facing the contact surface 34 on shaft 22. The elongated handle 12 is positionable between the contact surface 34 and contact region 46 permitting clamping attachment of the auxiliary handle 14 to the elongated handle 12 at any point along its length.

Preferably, the contact surface 46 is also divided into contact faces 46a and 46b which are positioned angularly with respect to one another so as to face another common center 48 between the two contact faces 46a and 46b and preferably located on the long axis 32 of shaft 22. Similar to contact faces 34a and 34b, the contact faces 46a and 46b are arranged on opposite sides of the long axis 32 to provide at least two contact points engaging the elongated tool handle 12 in spaced relation to one another circumferentially around the tool handle. In addition to allowing clamp 44 to accommodate a wide range sizes and shapes of tool handle 12, use of two additional contact faces 46a and 46b provides a secure and stable four point contact engagement of the auxiliary handle 14 to the tool handle 12.

Tool handle 12 is effectively clamped between the contact faces 34a, 34b, 46a and 46b preferably through the use of fasteners 50. Each fastener 50 has one end comprising a hook 52. Hooks 52 are adapted to respectively engage holes 54 positioned on opposite sides of the shaft 22 thereby attaching the fasteners 50 to the shaft. The other ends 56 of fasteners 50 are threaded so as to accept respective threaded retaining nuts 58. Clamping piece 45 has a pair of flanges 60 which extend outwardly from opposite sides of contact faces 46a and 46b. Apertures 62 in the flanges are adapted to receive threaded ends 56 of fasteners 50. Clamping action is achieved by retaining nuts 58 engaging threaded ends 56 of fasteners 50 and bearing on flanges 60 to clamp the contact region 46 and contact surface 34 against tool handle 12.

The auxiliary handle 14 may be readily repositioned along the elongated handle 12 by loosening nuts 58, sliding the auxiliary handle 14 along the elongated tool handle 12 to a new position, and retightening the nuts, thus, allowing the auxiliary handle to adapt to the sizes of different users.

As shown in FIG. 3, the fasteners 50 are attached along the outside surface 64 of shaft 22 by a cross fastener 66 and clips 68. As shown in FIGS. 4 and 5, cross fastener 66 passes through a hole 70 which preferably passes through a diameter of shaft 22. Clips 68 are secured at either end of the cross fastener 66 which in turn engages a nut 72. Each clip 68 extends from the cross fastener 66 and is in overlying engagement with a fastener 50 on either side of shaft 22. When nut 72 is tightened, clips 68 clamp the fasteners 50 against the outside surface 64 of shaft 22 thereby preventing the auxiliary handle 14 from rotating relative to the elongated handle 12 when force is applied to either or both handles. A locking washer 74 may be used to prevent the nut 72 from backing off.

Preferably, auxiliary handle 14 is molded from a high impact plastic such as polyethylene. Such material provides a strong, lightweight, inexpensive and durable handle. The hardware such as the fasteners 50 and 66, nuts 58 and 72, clips 68 and clamping piece 44 are preferably a non-corroding high strength material such as stainless steel. Fasteners 50 may be bent as shown in FIG. 4, the bend allowing the fasteners to accommodate the angle 42 to allow the auxiliary handle 14 to be angled relatively to the elongated handle 12 as described above.

In use, as shown in FIG. 2, the user is able to remain substantially upright while grasping both the elongated handle 12 and the auxiliary handle 14, allowing the muscle groups of the arms to be used to lift or otherwise move bulk material with the working piece 18 of the tool 10 with little or no strain on the back muscles as compared with the posture shown in FIG. 1 where the back muscles do a significant part of the work.

When fitted to tools with an elongated handle, the auxiliary handle according to the invention reduces fatigue and the potential for injury due to back strain or sprain and provides a tool which is ergonomically adapted for use by people efficiently and safely.

What is claimed is:

1. An auxiliary handle attachable to an elongated tool handle of a tool to facilitate manual lifting of a working end of said tool, said auxiliary handle comprising:
   an elongated shaft having a contact surface at one end adapted to engage said tool handle;
   a clamp attached to said shaft at said one end for clamping said contact surface against said tool handle, said clamp comprising:
   a clamping piece having a contact region adapted to engage said tool handle, said contact region being positioned opposite to and facing said contact surface;

a pair of flanges extending outwardly from opposite sides of said contact region transversely to said tool handle;

a pair of elongated fasteners mounted along opposite sides of said shaft at said one end, each said fastener comprising a first end engageable with said shaft and a second end engageable with one of said flanges, each of said fasteners comprising a hook at said first end, said hooks adapted to engage a pair of holes positioned on opposite sides of said shaft for attaching said fasteners to said shaft on opposite sides thereof, said fasteners clamping said contact region and said contact surface against said tool handle for retaining said auxiliary handle to said tool handle; and a gripping yoke mounted on an opposite end of said shaft for manual gripping.

2. An auxiliary handle according to claim 1, wherein said contact surface comprises a pair of contact faces angularly oriented relatively to one another so as to face a common center, said contact faces contacting said tool handle in spaced relation to one another circumferentially around said tool handle.

3. An auxiliary handle according to claim 2, wherein said contact faces are angularly oriented relatively to the long axis of said shaft about an axis perpendicular to both said long axis of said shaft and the long axis of said tool handle for orienting said shaft angularly relatively to said tool handle.

4. An auxiliary handle according to claim 1, wherein said contact region comprises a pair of contact faces angularly oriented relatively to one another so as to face a common center, said contact faces contacting said tool handle in spaced relation to one another circumferentially around said tool handle.

5. An auxiliary handle according to claim 1, wherein said clamp is adjustably positionable along the length of said elongated tool handle for positioning said gripping yoke at a position allowing manual grasping thereof by a user in a substantially upright posture.

6. An auxiliary handle according to claim 1, wherein each of said fasteners has a threaded second end adapted to receive a respective retaining nut, said flanges each having an aperture therein sized to receive one of said threaded ends, said retaining nuts engaging said flanges and being tightenable for clamping said contact surface and said contact region against said tool handle.

7. An auxiliary handle according to claim 6, further comprising:

a cross fastener extending transversely through said shaft proximate to said one end; and a pair of clips secured on opposite sides of said shaft by said cross fastener, said clips engaging said pair of elongated fasteners and retaining said fasteners against said shaft.

8. An auxiliary handle according to claim 1, wherein said gripping yoke comprises a pair of side portions extending from said opposite end of said shaft, said side portions being in spaced relation to one another and defining an opening therebetween, a hand grip attached between said side portions and oriented transversely to said shaft, said hand grip being adapted for manual gripping to facilitate manual lifting of said tool.

9. An auxiliary handle according to claim 8, wherein said side portions extend substantially parallel to said shaft and said hand grip extends substantially perpendicularly to said side portions.

10. An auxiliary handle attachable to an elongated tool handle of a tool, said elongated tool handle having a working end with a working piece adapted to move bulk material, said auxiliary handle comprising:

an elongated shaft having first and second ends and a long axis oriented lengthwise therealong;

a gripping yoke attached to said first end of said shaft, said gripping yoke being adapted to facilitate manual grasping of said auxiliary handle and lifting of said tool;

a contact surface positioned at said second end of said shaft, said contact surface being positionable in abutting engagement with said elongated tool handle at a point between said working end and an opposite end of said elongated tool handle;

a clamping piece having a contact region positioned facing said contact surface and engageable with said elongated tool handle, said elongated tool handle being positionable between said contact surface and said contact region for attachment of said auxiliary handle to said elongated tool handle; and a plurality of fasteners extending substantially longitudinally along said shaft from said second end for engaging and attaching said clamping piece to said shaft, one of said fasteners comprising an elongated bolt having a threaded portion at one end thereof and extending from said second end of said shaft, said clamping piece having a flange extending outwardly therefrom and positioned substantially perpendicularly to said bolt, said flange having an aperture adapted to receive said bolt, said bolt having a threaded retaining nut engageable therewith and bearing on said flange for retaining said clamping piece to said second end of said shaft, said bolt extending along an outer surface of said shaft, the other end of said bolt being angularly oriented toward said long axis of said shaft, said shaft having a hole extending toward said long axis and adapted to receive said other end of said bolt, whereby, when attached to said elongated tool handle, said auxiliary handle is grasped by one hand of a user and said elongated tool handle is grasped by the other hand of the user, said auxiliary handle allowing said tool to be lifted by said user while assuming a substantially upright position.

11. An auxiliary handle according to claim 10, wherein said contact surface comprises a pair of first contact faces oriented angularly with respect to said long axis of said shaft, said first contact faces facing toward said long axis on opposite sides thereof and thereby being engageable with said tool handle.

12. An auxiliary handle according to claim 11, wherein said contact region comprises a pair of second contact faces oriented angularly with respect to said long axis of said shaft, said second contact faces facing toward said long axis on opposite sides thereof and thereby being engageable with said tool handle.

13. An auxiliary handle according to claim 10, further comprising a cross fastener extending through said shaft and oriented transversely to said long axis, and a clip extending from said cross fastener in overlying engagement with said fastener, said fastener being captured between said outer surface of said shaft and said clip.

\* \* \* \* \*